US012725891B2

(12) United States Patent
Lee et al.

(10) Patent No.: US 12,725,891 B2
(45) Date of Patent: Sep. 1, 2026

(54) BATTERY CELL FOR TESTING INTERNAL SHORT CIRCUIT, AND METHOD FOR TESTING INTERNAL SHORT CIRCUIT OF BATTERY CELL BY USING SAME

(71) Applicant: LG ENERGY SOLUTION, LTD., Seoul (KR)

(72) Inventors: Sol Nip Lee, Daejeon (KR); Jeong Min Yang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 392 days.

(21) Appl. No.: 18/430,510

(22) Filed: Feb. 1, 2024

(65) Prior Publication Data

US 2024/0178533 A1 May 30, 2024

Related U.S. Application Data

(63) Continuation of application No. 17/761,869, filed as application No. PCT/KR2020/018055 on Dec. 10, 2020, now Pat. No. 11,923,567.

(30) Foreign Application Priority Data

Dec. 17, 2019 (KR) ........................ 10-2019-0169230

(51) Int. Cl.
*H01M 50/574* (2021.01)
*H01M 4/66* (2006.01)
(Continued)

(52) U.S. Cl.
CPC ......... *H01M 50/574* (2021.01); *H01M 4/661* (2013.01); *H01M 10/052* (2013.01);
(Continued)

(58) Field of Classification Search
CPC ........... H01M 50/574; H01M 10/4235; H01M 10/42; H01M 10/4214; H01M 10/425;
(Continued)

(56) References Cited

U.S. PATENT DOCUMENTS 11,923,567 B2 * 3/2024 Lee .................. H01M 10/0585
2008/0187826 A1 8/2008 Kasamatsu et al.
(Continued)

FOREIGN PATENT DOCUMENTS

CN 101615694 A 12/2009
CN 102334216 A 1/2012
(Continued)

OTHER PUBLICATIONS

Extended European Search Report dated Nov. 24, 2022 issued in corresponding European Patent Application No. 20902293.8.
(Continued)

*Primary Examiner* — Jeremiah R Smith
(74) *Attorney, Agent, or Firm* — Morgan, Lewis & Bockius LLP

(57) ABSTRACT

The present invention relates to a battery cell for evaluating an internal short circuit, and a method for evaluating using the battery cell, wherein an internal short circuit state of a battery cell can be easily induced and, at the same time, an effective internal short circuit evaluation is possible, and the battery cell comprising: first and second electrodes which comprise a coated region on which an electrode mixture layer is coated on a metal current collector and a non-coated region on which an electrode mixture layer is not coated, and which comprise first and second electrode tabs which protrude in one direction from the coated region and do not have an electrode mixture layer coated thereon.

20 Claims, 9 Drawing Sheets

(51) Int. Cl.

| | |
|---|---|
| ***H01M 10/052*** | (2010.01) |
| ***H01M 10/0585*** | (2010.01) |
| ***H01M 10/42*** | (2006.01) |
| ***H01M 10/44*** | (2006.01) |
| ***H01M 10/48*** | (2006.01) |
| ***H01M 50/105*** | (2021.01) |
| ***H01M 50/414*** | (2021.01) |
| ***H01M 50/431*** | (2021.01) |
| ***H01M 50/443*** | (2021.01) |
| ***H01M 50/454*** | (2021.01) |
| ***H01M 50/457*** | (2021.01) |
| ***H01M 50/46*** | (2021.01) |
| ***H01M 50/463*** | (2021.01) |
| ***H01M 50/528*** | (2021.01) |
| ***H01M 50/586*** | (2021.01) |
| ***H01M 50/59*** | (2021.01) |

(52) U.S. Cl.

CPC ... *H01M 10/0585* (2013.01); *H01M 10/4214* (2013.01); *H01M 10/4235* (2013.01); *H01M 10/425* (2013.01); *H01M 10/4285* (2013.01); *H01M 10/44* (2013.01); *H01M 10/48* (2013.01); *H01M 50/105* (2021.01); *H01M 50/414* (2021.01); *H01M 50/431* (2021.01); *H01M 50/443* (2021.01); *H01M 50/454* (2021.01); *H01M 50/457* (2021.01); *H01M 50/46* (2021.01); *H01M 50/463* (2021.01); *H01M 50/528* (2021.01); *H01M 50/586* (2021.01); *H01M 50/59* (2021.01); *H01M 2200/00* (2013.01)

(58) Field of Classification Search

CPC .. H01M 10/4285; H01M 10/48; H01M 50/46; H01M 50/463; H01M 50/586; H01M 50/59; H01M 2200/00

See application file for complete search history.

(56) References Cited

U.S. PATENT DOCUMENTS

| | | | |
|---|---|---|---|
| 2009/0317701 | A1 | 12/2009 | Cha et al. |
| 2011/0143174 | A1 | 6/2011 | Kim et al. |
| 2013/0209841 | A1 | 8/2013 | Keyser et al. |
| 2014/0349179 | A1 | 11/2014 | Chun |
| 2017/0187078 | A1 | 6/2017 | Keates et al. |
| 2018/0120381 | A1 | 5/2018 | Fuchs et al. |
| 2018/0123166 | A1 | 5/2018 | Fakhri et al. |
| 2019/0190092 | A1 | 6/2019 | Kim et al. |
| 2020/0280071 | A1 | 9/2020 | Yoshii |
| 2020/0295414 | A1 | 9/2020 | Kim et al. |

FOREIGN PATENT DOCUMENTS

| | | | |
|---|---|---|---|
| EP | 2337138 | A1 | 6/2011 |
| EP | 3300158 | A1 | 3/2018 |
| EP | 3316352 | A1 | 5/2018 |
| JP | 1999-040210 | A | 2/1999 |
| JP | 2001-068156 | A | 3/2001 |
| JP | 2005-100899 | A | 4/2005 |
| JP | 2008-192495 | A | 8/2008 |
| JP | 2008-218390 | A | 9/2008 |
| JP | 2008-270090 | A | 11/2008 |
| JP | 2009-054300 | A | 3/2009 |
| JP | 2013-080636 | A | 5/2013 |
| JP | 2016-219172 | A | 12/2016 |
| JP | 2017-040633 | A | 2/2017 |
| JP | 2017-182976 | A | 10/2017 |
| JP | 7065962 | B2 | 2/2021 |
| KR | 10-2009-0071664 | A | 7/2009 |
| KR | 10-2009-0130412 | A | 12/2009 |
| KR | 10-2015-0033888 | A | 4/2015 |
| KR | 10-2015-0041840 | A | 4/2015 |
| KR | 10-2015-0050116 | A | 5/2015 |
| KR | 20150071250 | A | 6/2015 |
| KR | 10-2015-0083521 | A | 7/2015 |
| KR | 10-2017-0139305 | A | 12/2017 |
| KR | 10-2019-0046483 | A | 5/2019 |
| KR | 10-2019-0049191 | A | 5/2019 |
| WO | 2008/072456 | A1 | 6/2008 |
| WO | 2012-117660 | A | 7/2012 |

OTHER PUBLICATIONS

Notice of Allowance dated Jul. 9, 2024 issued in Korean Patent Application No. 10-2019-0169230.

Office Action dated Jun. 28, 2024 issued in Indian Patent Application No. 202217012998.

International Search Report issued in corresponding International Patent Application No. PCT/KR2020/018055 issued Apr. 15, 2021.

Written Opinion issued in corresponding International Patent Application No. PCT/KR2020/018055 issued Apr. 15, 2021.

International Search Report (with partial translation) and Written Opinion dated Apr. 15, 2021 issued in corresponding International Patent Application No. PCT/KR2020/018055.

Office Action issued in corresponding Japanese Patent Application No. 2022-516365 dated Apr. 3, 2023.

* cited by examiner

【FIG. 1】
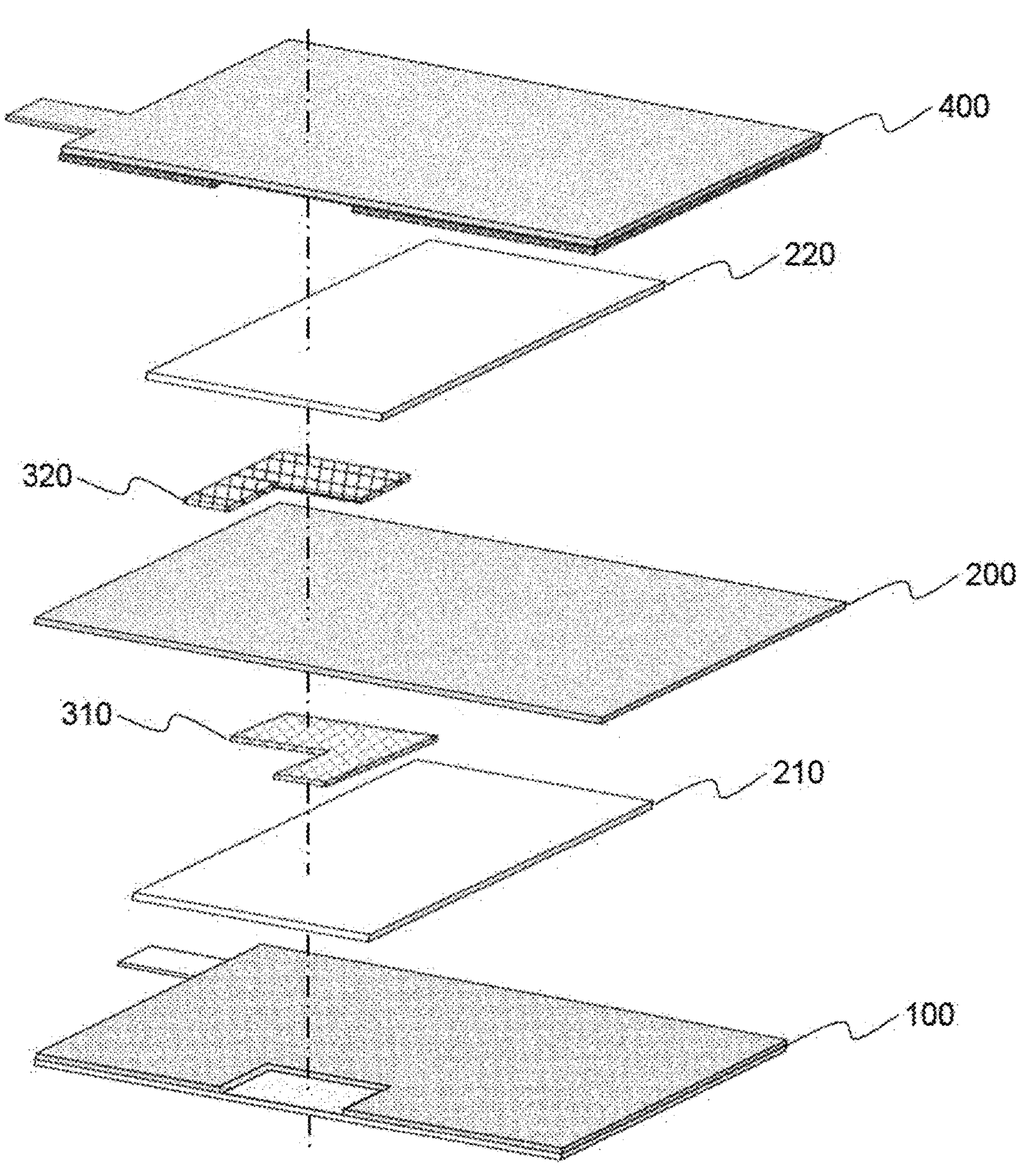

【FIG. 2】
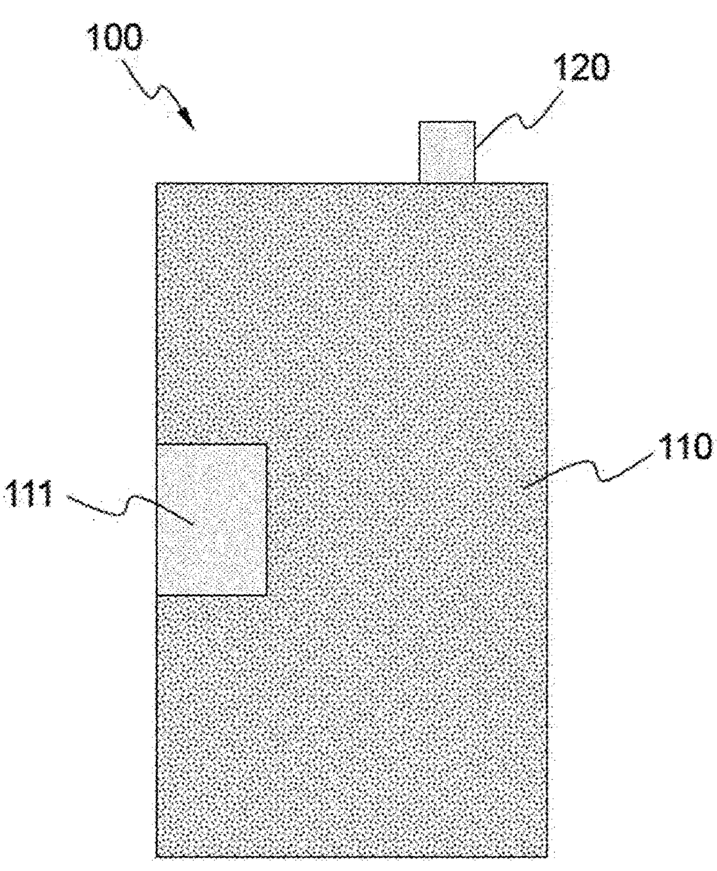

【FIG. 3】
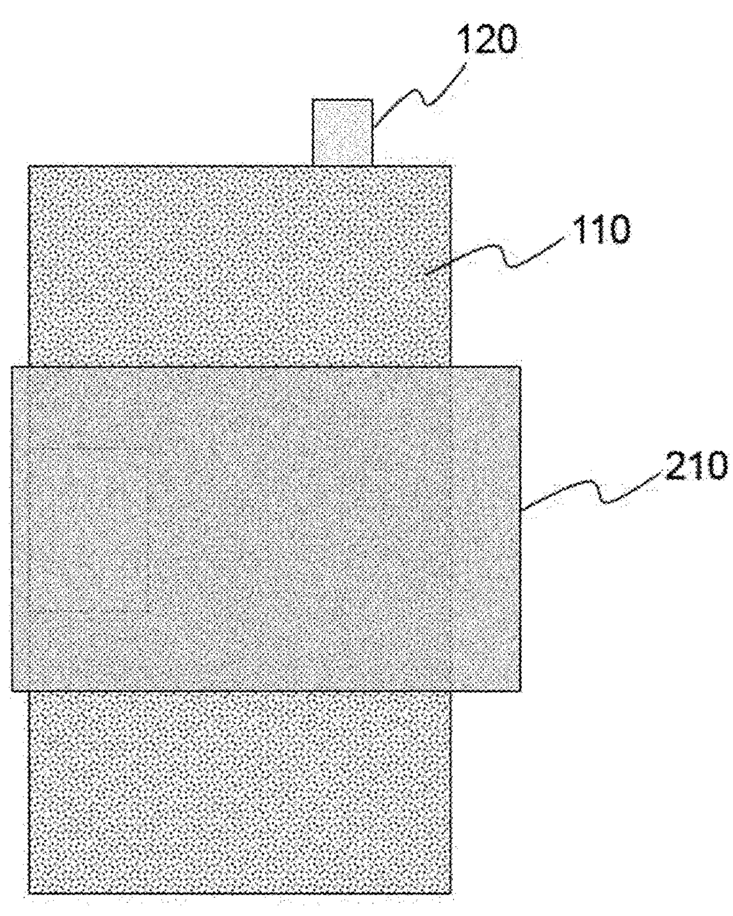

【FIG. 4】
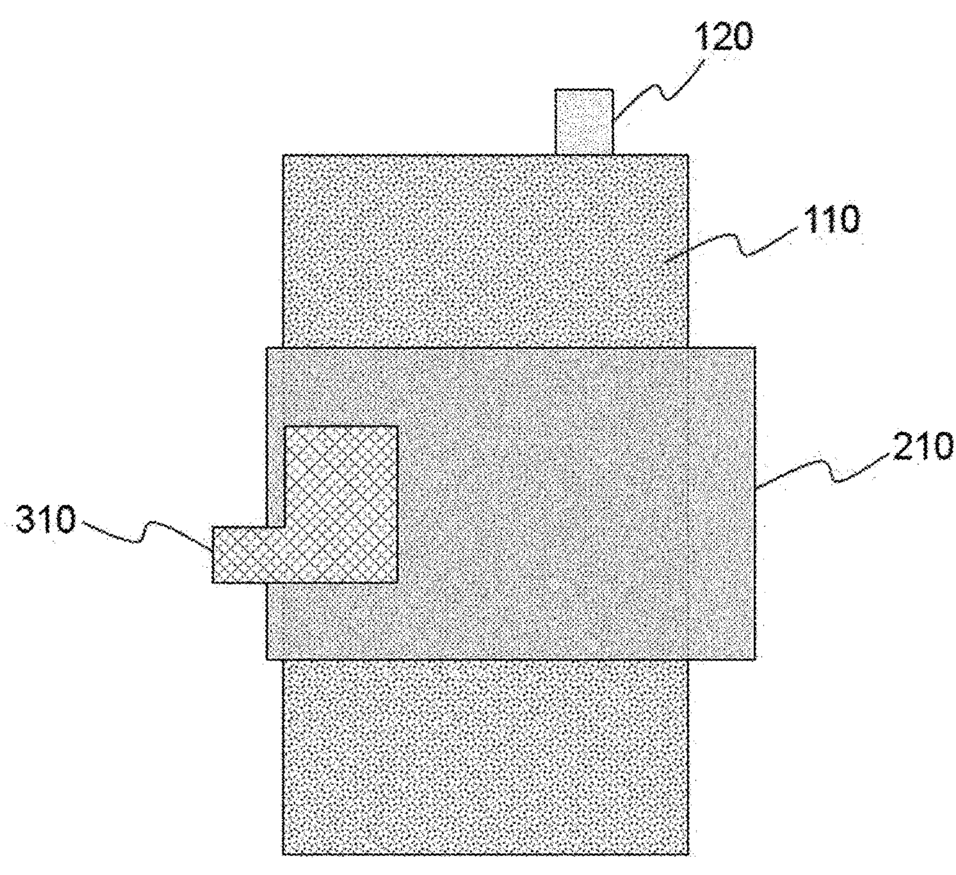

【FIG. 5】
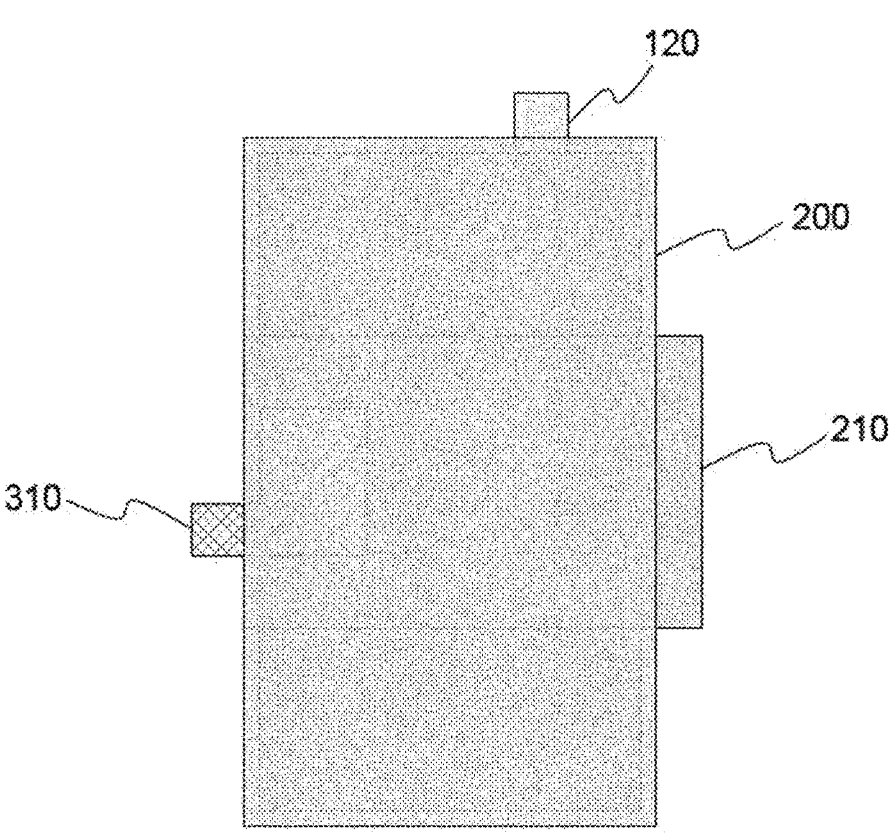

【FIG. 6】
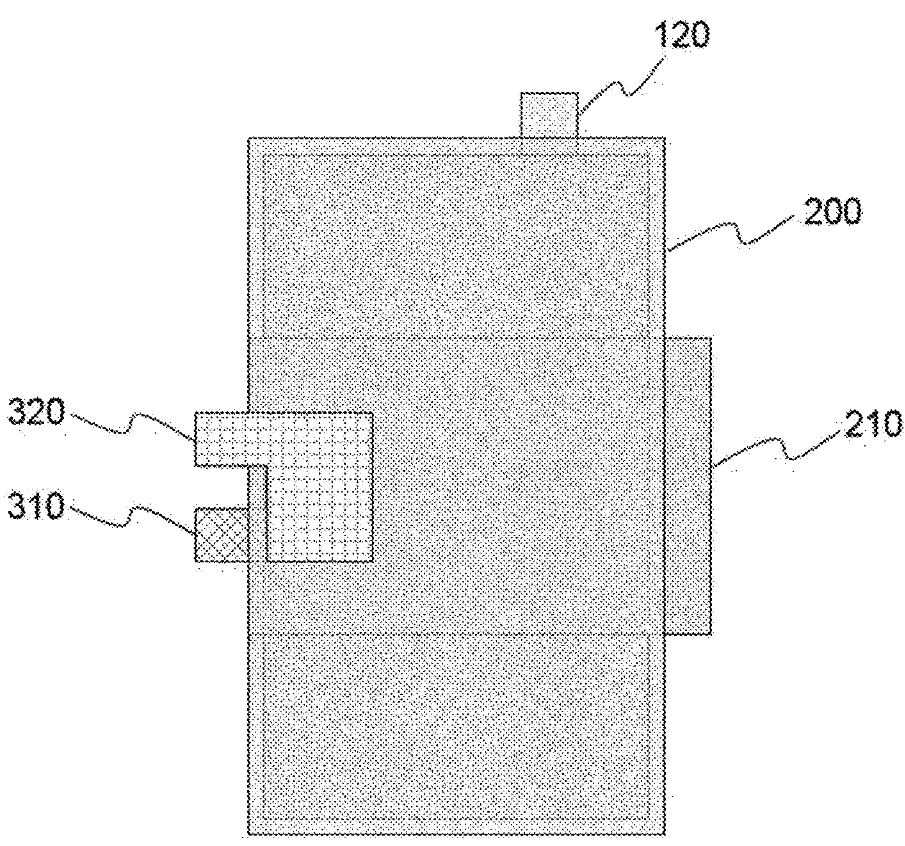

【FIG. 7】
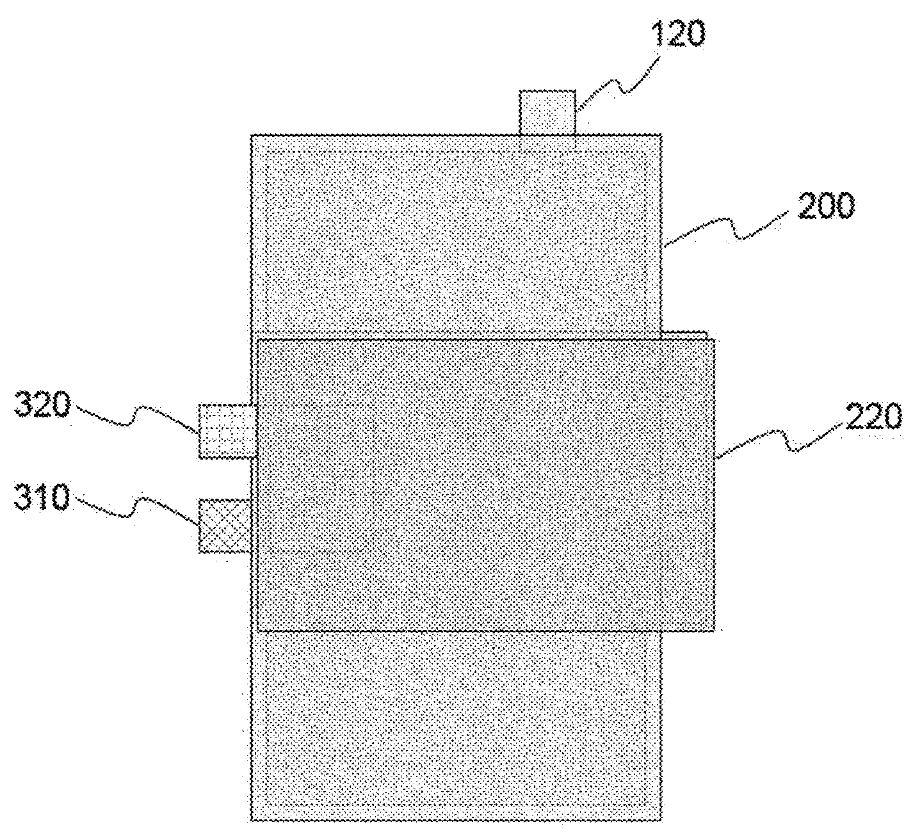

【FIG. 8】
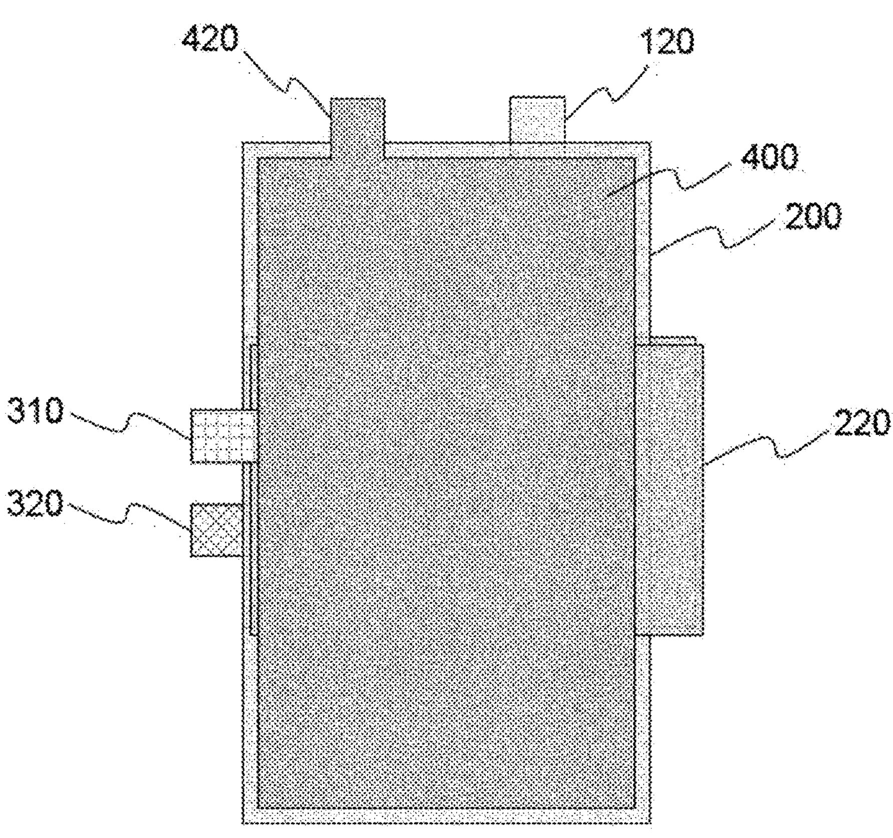

【FIG. 9】
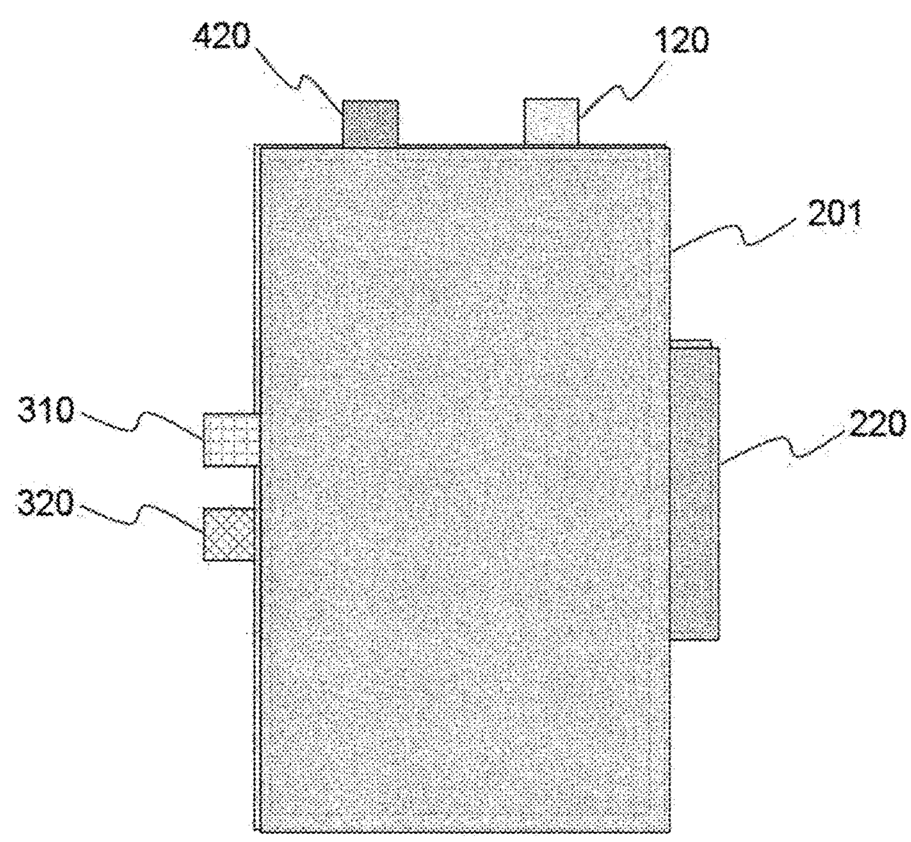

BATTERY CELL FOR TESTING INTERNAL SHORT CIRCUIT, AND METHOD FOR TESTING INTERNAL SHORT CIRCUIT OF BATTERY CELL BY USING SAME

TECHNICAL FIELD

The present invention relates to a battery cell for evaluating an internal short circuit and a method for evaluating an internal short circuit of a battery cell using the same.

This application claims the benefit of priority based on Korean Patent Application No. 10-2019-0169230, filed on Dec. 17, 2019, and the entire contents of the Korean patent application are incorporated herein by reference.

BACKGROUND ART

In recent years, as the price of energy sources increases due to the depletion of fossil fuels and the interest of environmental pollution is amplified, the demand for environmentally friendly alternative energy sources has become an indispensable factor for future life. In particular, as technology development and demand for mobile devices increase, the demand for secondary batteries as energy sources is rapidly increasing.

In general, a secondary battery assembles an electrode assembly by using a positive electrode, a negative electrode, and interposing a separator between the positive electrode and the negative electrode. The assembled electrode assembly is mounted on a battery case and an electrolyte is injected to manufacture a battery cell.

Among secondary batteries, lithium secondary batteries are used in various fields due to their excellent electrical properties. However, the lithium secondary battery has a problem of low safety. For example, a lithium secondary battery may ignite or explode in abnormal operating conditions such as overcharging, overdischarging, exposure to high temperatures, or electrical short circuits. Specifically, heat and gas are generated as active materials or electrolytes, which are components of the battery cell, cause a decomposition reaction. The generated heat and gas increase the temperature and pressure inside the battery cell. The elevated temperature and pressure further accelerate the decomposition reaction and eventually cause ignition or explosion.

Therefore, it is very important to ensure the safety of the battery cell, and one of the methods is to evaluate the safety of the battery cell when an internal short circuit occurs. Particularly, there is a need for evaluation technologies that simulate a situation in which an internal short circuit of the battery cell occurs.

DISCLOSURE

Technical Problem

The present invention has been created to solve the above problems, and provides a battery cell for evaluating an internal short circuit capable of easily inducing an internal short circuit of a battery cell, and a method for evaluating an internal short circuit of a battery cell using the same.

Technical Solution

The present invention provides a battery cell for evaluating an internal short circuit of the battery cell. In one example, a battery cell for evaluating an internal short circuit according to the present invention includes:

- a first electrode including a metal current collector, a first electrode mixture layer partially disposed on one or both surfaces of the metal current collector, and a first electrode tab, wherein:
- the first electrode includes a coated part region, in which the first electrode mixture layer is disposed on the one or both surfaces of the metal current collector,
- the first electrode tab protrudes in one direction in the coated part region,
- the first electrode mixture layer is not disposed on the first electrode tab, and
- the first electrode includes a non-coated part region, on which the first electrode mixture layer is not disposed;
- a first sub-separator configured to cover the non-coated part region of the first electrode and be formed to have an area greater than an area of the non-coated part region;
- a first short circuit electrode configured to be formed at a location corresponding to the non-coated part region of the first electrode and be formed to be protruded in one direction in the coated part region of the first electrode;
- a main separator configured to be interposed between the first electrode and a second electrode to cover the coated part region of the first electrode and a coated part region of the second electrode;
- a second short circuit electrode configured to be formed at a location corresponding to the non-coated part region of the first electrode and be formed to be protruded in one direction in the coated part region of the second electrode;
- a second sub-separator configured to cover the non-coated part region of the second electrode and be formed to have an area greater than that of the non-coated part region; and
- the second electrode including an another metal current collector, a second electrode mixture layer disposed on one or both surfaces of the another metal current collector, and the second electrode tab, wherein:
- the second electrode includes the coated part region, in which the second electrode mixture layer is disposed on the one or both surfaces of the another metal current collector,
- the second electrode tab, which protrudes in one direction in the coated part region,
- the second electrode mixture layer is not disposed on the second electrode tab, and
- the second electrode includes a non-coated part region, on which the second electrode mixture layer is not disposed.

In a specific example, the first and second short circuit electrodes comprises a porous metal foil.

In another specific example, the first and second short circuit electrodes comprises a porous metal foil having a porosity ratio of 50% (v/v) or more. respectively.

In one example, the first sub-separator is extended in a direction opposite to a direction in which the first short circuit electrode protrudes in the coated part region of the first electrode, and the second sub-separator is extended in a direction opposite to a direction in which the second short circuit electrode protrudes in the coated part region of the second electrode.

In further another example, in the first and second electrodes, the first and second electrode tabs each independently protrudes in one direction or a direction opposite to the one direction in the coated part region, the first and second short circuit electrodes protrude in a direction perpendicular to a direction in which the first and second electrode tabs protrude, and the first and second sub-separators are extended in a direction opposite to a direction in which the first and second short circuit electrodes protrude.

In one example, the battery cell further includes an electrode assembly having a structure which comprises a plurality of unit laminate, in each of which the first electrode, the main separator and the second electrode are sequentially formed, wherein at least one of the unit laminates has a structure in which the first electrode; the first sub-separator; the first short circuit electrode; the main separator; the second short circuit electrode; the second sub-separator; and the second electrode are sequentially formed.

In a specific example, the battery cell for evaluating an internal short circuit according to the present invention further includes a main separator interposed between the unit laminates.

In a specific example, the first and second sub-separators have a structure of a fabric separator which is formed of a porous fabric of a film material, and the main separator has a structure of a safety-reinforced separator in which inorganic particles are dispersed on one or both surfaces of a fabric separator.

In one example, the metal current collector of the first electrode and the first short circuit electrode comprises homogeneous materials, and the metal current collector of the second electrode and the second short circuit electrode comprises another homogeneous materials.

In further another example, in the first and second electrodes, an area ratio of the non-coated part region to the coated part region is in a range of 5 to 15%.

In a specific example, the battery cell is a pouch-type lithium secondary battery.

Further, the present invention provides a method for evaluating an internal short circuit of a battery cell by using the above-described battery cell. In one example, a method for evaluating an internal short circuit of a battery cell according to the present invention includes a step of removing first and second sub-separators in a state in which first and second short circuit electrodes are electrically connected to each other while charging or discharging the battery cell.

In a specific example, the first and second sub-separators are extended in a direction opposite to a direction in which the first and second short circuit electrodes protrude, and the step of removing the first and second sub-separators is performed by taking out extended portions of the first and second sub-separators, respectively.

Advantageous Effects

According to a battery cell for evaluating an internal short circuit and a method for evaluating an internal short circuit of a battery cell using the same according to the present invention, it is possible to easily induce an internal short circuit state of a battery cell and effectively evaluate the internal short circuit.

BRIEF DESCRIPTION OF THE DRAWINGS

FIG. 1 is an exploded perspective view of a battery cell for evaluating an internal short circuit according to an embodiment of the present invention.

FIGS. 2 to 9 are diagrams illustrating assembling procedures of a battery cell for evaluating an internal short circuit according to one embodiment of the invention.

DETAILED DESCRIPTION OF THE PREFERRED EMBODIMENTS

Hereinafter, the present invention will be described in detail with reference to the drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

The present invention provides a battery cell for evaluating an internal short circuit. In one example, a battery cell for evaluating an internal short circuit according to the present invention includes:

a first electrode including a metal current collector, a first electrode mixture layer partially disposed on one or both surfaces of the metal current collector, and a first electrode tab, wherein:

the first electrode includes a coated part region, in which the first electrode mixture layer is disposed on the one or both surfaces of the metal current collector, the first electrode tab protrudes in one direction in the coated part region, the first electrode mixture layer is not disposed on the first electrode tab, and the first electrode includes a non-coated part region, on which the first electrode mixture layer is not disposed;

a first sub-separator configured to cover the non-coated part region of the first electrode and be formed to have an area greater than an area of the non-coated part region;

a first short circuit electrode configured to be formed at a location corresponding to the non-coated part region of the first electrode and be formed to be protruded in one direction in the coated part region of the first electrode;

a main separator configured to be interposed between the first electrode and a second electrode to cover the coated part region of the first electrode and a coated part region of the second electrode;

a second short circuit electrode configured to be formed at a location corresponding to the non-coated part region of the first electrode and be formed to be protruded in one direction in the coated part region of the second electrode;

a second sub-separator configured to cover the non-coated part region of the second electrode and be formed to have an area greater than that of the non-coated part region; and the second electrode including an another metal current collector, a second electrode mixture layer disposed on one or both surfaces of the another metal current collector, and the second electrode tab, wherein:

the second electrode includes the coated part region, in which the second electrode mixture layer is disposed on the one or both surfaces of the another metal current collector, the second electrode tab, which protrudes in one direction in the coated part region, the second electrode mixture layer is not disposed on the second electrode tab, and the second electrode includes a non-coated part region, on which the second electrode mixture layer is not disposed.

By using the battery cell for evaluating the internal short circuit, it is possible to induce the internal short circuit state of the battery cell by removing or partially taking out the first and second sub-separators while charging or discharging the battery cell. Further, according to the present invention, it is possible to effectively evaluate the heating properties when an internal short circuit occurs by lithium precipitation by simulating a case of lithium precipitation in a lithium secondary battery.

In one embodiment, the first and second short circuit electrodes comprises a porous metal foil. The present invention provides a moving passage of lithium ions while charging and discharging the battery cell by using first and second short circuit electrodes formed of porous metal foils, respectively. For example, when the first electrode is a positive electrode and formed of an aluminum foil, the first short circuit electrode can be formed of a porous aluminum foil. When the second electrode is a negative electrode and is formed of a copper foil, the second short circuit electrode can be formed of a porous copper foil.

In a specific embodiment, the first and second short circuit electrodes comprises a porous metal foil having a porosity ratio of 50% (v/v) or more. The porosities of the first and second short circuit electrodes range from 50% to 80%, 50 to 70%, or 55 to 65%, respectively. The porosity ratio indicates a fraction of the area in which the pores are formed compared to the entire area of each short circuit electrode. The range of the porosity ratio is for smooth movement of lithium ions while maintaining the mechanical strength of each short circuit electrode at a constant level.

In another specific embodiment, the first sub-separator is extended in a direction opposite to a direction in which the first short circuit electrode protrudes in the coated part region of the first electrode, and the second sub-separator is extended in a direction opposite to a direction in which the second short circuit electrode protrudes in the coated part region of the second electrode. By controlling the extension direction of each sub-separator to a direction opposite to a direction in which each short circuit electrode protrudes, electrical connection of each short circuit electrode is made easy, and removal of each sub-separator is made easy.

In one embodiment, in the first and second electrodes, the first and second electrode tabs each independently protrudes in one direction or a direction opposite to the one direction in the coated part region, and the first and second short circuit electrodes protrude in a direction perpendicular to a direction in which the first and second electrode tabs protrude. Further, the first and second sub-separators are extended in a direction opposite to a direction in which the first and second short circuit electrodes protrude.

The battery cell according to the present invention includes a structure in which the first electrode tab and the second electrode tab protrude in the same direction or are formed in the opposite direction. For example, the first electrode tab protrudes forward, and the second electrode tab protrudes backward. At this time, the first and second short circuit electrodes protrude to the left or right. This structural arrangement is for ease of operation when evaluating the battery cell. Specifically, the battery cell is a pouch-type or rectangular battery, and the first and second electrode tabs are formed in the same direction or a different direction, depending on the type of the battery. In this regard, by allowing the first and second short circuit electrodes to be formed in a direction perpendicular to that of the first and second electrode tabs, the evaluation can be performed simultaneously while charging/discharging the battery cell.

In one embodiment, the battery cell further includes an electrode assembly having a structure which comprises a plurality of unit laminate, in each of which the first electrode, the main separator and the second electrode are sequentially formed, wherein at least one of the unit laminates has a structure in which the first electrode; the first sub-separator; the first short circuit electrode; the main separator; the second short circuit electrode; the second sub-separator; and the second electrode are sequentially formed. The battery cell according to the present invention includes an electrode assembly of a large number of repeated structures. Herein, at least one of unit laminates for forming an electrode assembly has a structure for inducing and evaluating an internal short circuit. The structure for inducing and evaluating such an internal short circuit means a unit laminate in which a first electrode; a first sub-separator; a first short circuit electrode; a main separator; a second short circuit electrode; a second sub-separator; and a second electrode are sequentially formed.

In a specific embodiment, a main separator interposed between the unit laminates is further provided. The battery cell according to the present invention includes an electrode assembly having a structure in which unit laminates are repeated, and a separate separator is required for electrical insulation between respective unit laminates.

In a more specific embodiment, the first and second sub-separators have a structure of a fabric separator which is formed of a porous fabric of a film material, and the main separator has a structure of a safety-reinforced separator in which inorganic particles are dispersed on one or both surfaces of a fabric separator. The fabric separator means a separator made of a film material having a porous structure for movement of lithium ions, and the safety-reinforced separator refers to a form in which inorganic particles are dispersed on the surface of the fabric separator.

In one embodiment, the metal current collector of the first electrode and the first short circuit electrode are formed of homogeneous materials, and the metal current collector of the second electrode and the second short circuit electrode are formed of homogeneous materials. For example, when the first electrode is a positive electrode and is a foil formed of aluminum or an alloy of aluminum, the first short circuit electrode is formed of aluminum or an alloy of aluminum and has a porous form. Further, in the case where the second electrode is a negative electrode and a foil formed of a copper or an alloy of a copper, the second short circuit electrode is formed of a copper or an alloy of a copper and has a porous form.

In further another embodiment, in the first and second electrodes, a ratio of an area, in which the non-coated part region is formed in the coated part region, is in a range of 5 to 15%. Specifically, the ratio of the area where the non-coated part region is formed in the coated part region is in a range of 5 to 10%, 10 to 15%, or 7 to 12%. In the present invention, the coated part region means a region excluding the electrode tab in the electrode current collector, and corresponds to the range in which the electrode mixture layer has been applied. The non-coated part region refers to a region where a mixture layer has not been applied to a part of the coated part region. Further, the ratio of the area where the non-coated part region is formed in the coated part region means the ratio of the area where the non-coated part region is formed in the above-described coated part region.

The battery cell is a secondary battery, specifically, a lithium secondary battery, and is a pouch-type or rectangular battery. For example, the battery cell is a pouch-type lithium secondary battery.

Further, the present invention provides a method for evaluating an internal short circuit of a battery cell by using the above-described battery cell. In one embodiment, a method for evaluating an internal short circuit of a battery cell according to the present invention includes a step of removing first and second sub-separators in a state in which first and second short circuit electrodes are electrically connected to each other while charging or discharging the battery cell.

Herein, removing the first and second sub-separators means a process of inducing a short circuit in a battery cell by taking out the extended portion of the first and second sub-separators. According to the evaluation method according to the present invention, it is possible to induce the internal short circuit state of the battery cell by removing or partially taking out the first and second sub-separators while charging or discharging the battery cell.

The internal short circuit evaluation method of the battery cell according to the present invention includes a step of performing an evaluation of the battery cell while the internal short circuit of the battery cell is induced as described above. The step of performing the above evaluation can be performed by measuring one or more of the voltage, current, and resistance to the battery cell. For example, the step of performing the evaluation is performed by measuring current for the battery cell.

In one embodiment, the first and second sub-separators are extended in a direction opposite to a direction in which the first and second short circuit electrodes protrude, and the step of removing the first and second sub-separators is performed by taking out extended portions of the first and second sub-separators, respectively.

The present invention provides a battery cell for evaluating the above-described internal short circuit and a method for evaluating an internal short circuit of a battery cell by using the same. The battery cell is a secondary battery, and specifically a lithium secondary battery. For example, the lithium secondary battery includes: an electrode assembly including a positive electrode, a negative electrode, and a separator interposed between the positive electrode and the negative electrode; a non-aqueous electrolyte impregnating the electrode assembly; and a battery case containing the electrode assembly and the non-aqueous electrolyte.

The positive electrode has a structure in which a positive electrode mixture layer is stacked on one or both sides of a positive electrode current collector. The positive electrode active materials may each independently be a lithium-containing oxide, and may be the same or different. A lithium-containing transition metal oxide may be used as the lithium-containing oxide. In one example, the positive electrode mixture layer includes a conductive material and a binder polymer in addition to the positive electrode active material, and if necessary, may further include a positive electrode additive commonly used in the art.

The positive electrode active material may be a lithium-containing oxide, and may be the same or different. A lithium-containing transition metal oxide may be used as the lithium-containing oxide.

For example, the lithium-containing transition metal oxide may be any one or a mixture of two or more selected from the group consisting of $Li_xCoO_2$ ($0.5<x<1.3$), $Li_xNiO_2$ ($0.5<x<1.3$), $Li_xMnO_2$ ($0.5<x<1.3$), $Li_xMn_2O_4$ ($0.5<x<1.3$), $Li_x(Ni_aCo_bMn_c)O_2$ ($0.5<x<1.3$, $0<a<1$, $0<b<1$, $0<c<1$, $a+b+c=1$), $Li_xNi_{1-y}Co_yO_2$ ($0.5<x<1.3$, $0<y<1$), $Li_xCo_{1-y}Mn_yO_2$ ($0.5<x<1.3$, $0\leq y<1$), $Li_xNi_{1-y}Mn_yO_2$ ($0.5<x<1.3$, $0\leq y<1$), $Li_x(Ni_aCo_bMn_c)O_4$ ($0.5<x<1.3$, $0<a<2$, $0<b<2$, $0<c<2$, $a+b+c=2$), $Li_xMn_{2-z}Ni_zO_4$ ($0.5<x<1.3$, $0<z<2$), $Li_xMn_{2-z}CO_2O_4$ ($0.5<x<1.3$, $0<z<2$), $Li_xCoPO_4$ ($0.5<x<1.3$) and $Li_xFePO_4$ ($0.5<x<1.3$). In addition, the lithium-containing transition metal oxide may be coated with a metal such as aluminum (Al) or a metal oxide. Further, in addition to the lithium-containing transition metal oxide, one or more of sulfide, selenide, and halide may be used.

The current collector used for the positive electrode is a metal having high conductivity, and any metal which the positive electrode active material slurry may be easily attached to and which is not reactive in the voltage range of the secondary battery can be used. Specifically, non-limiting examples of the current collector for the positive electrode include aluminum, nickel, or a foil manufactured by a combination thereof. Specifically, the current collector for the positive electrode is formed of metal components described above, and includes a metal plate having a through hole in the thickness direction, and an ion conductive porous reinforcing material filled in the through hole of the metal plate.

The negative electrode may further include a negative electrode mixture layer, and may include a carbon material, lithium metal, silicon, or tin. When a carbon material is used as the negative electrode active material, both low crystalline carbon and high crystalline carbon may be used. Representative examples of low crystalline carbon include soft carbon and hard carbon. Representative examples of high crystalline carbon include natural graphite, kish graphite, pyrolytic carbon, mesophase pitch based carbon fiber, mesocarbon microbeads, mesophase pitches, and high-temperature calcined carbons such as petroleum or coal tar pitch derived cokes.

Non-limiting examples of the current collector used for the negative electrode include copper, gold, nickel, or a foil manufactured by a copper alloy or a combination thereof. In addition, the current collector may be used by stacking substrates made of the above materials. Specifically, the current collector for the negative electrode is formed of metal components described above, and includes a metal plate having a through hole in the thickness direction, and an ion conductive porous reinforcing material filled in the through hole of the metal plate.

In addition, the negative electrode may include a conductive material and a binder commonly used in the art.

The separator may be made of any porous substrate used in a lithium secondary battery, and for example, a polyolefin-based porous membrane or a nonwoven fabric may be used, but the present invention is not particularly limited thereto. Examples of the polyolefin-based porous membrane include polyethylene such as high density polyethylene, linear low density polyethylene, low density polyethylene, ultra high molecular weight polyethylene, and a membrane in which polyolefin-based polymers, such as polypropylene, polybutylene, and polypentene, are each formed alone or in a mixture thereof. In the present invention, the fabric separator can be applied to the first and second sub-separators. The fabric separator corresponds to the separator described above. Further, the main separator has a structure in which inorganic particles are dispersed on the surface of the fabric separator. For example, a variety of ceramic particles of a nano size can be applied to the inorganic particles.

According to an embodiment of the present invention, the electrolyte may be a non-aqueous electrolyte. Examples of the non-aqueous electrolyte include N-methyl-2-pyrrolidinone, propylene carbonate, ethylene carbonate, butylenecarbonate, dimethyl carbonate, diethyl carbonate, gamma-Butyrolactone, 1,2-dimethoxyethane, tetrahydroxyfuran, 2-methyltetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxymethane, dioxolane derivatives, sulfolane, methyl sulfolane, 1,3-dimethyl-2-imidazolidinone, propylene carbonate derivatives, tetrahydrofuran derivatives, ethers, methyl pyrophosphate, ethyl propionate, etc. However, it is not particularly limited thereto, and a number of electrolyte components commonly used in the field of lithium secondary batteries may be added or subtracted within an appropriate range.

Hereinafter, the present invention will be described in more detail through drawings and the like.

First Embodiment

FIG. 1 is an exploded perspective view of a battery cell for evaluating an internal short circuit according to an embodiment of the present invention. Referring to FIG. 1, the battery cell has a structure in which a first electrode 100, a first sub-separator 210, a first short circuit electrode 310, a main separator 200, a second short circuit electrode 320, a second sub-separator 220, and a second electrode 400 are sequentially stacked. The first electrode 100 has a structure in which a non-coated part is formed on a part of the surface of the first electrode. The first sub-separator 210 has a structure which covers the non-coated part formed in the first electrode 100 and is extended in a right direction. The first short circuit electrode 310 is located on the first sub-separator 210. The first short circuit electrode 310 is formed of a porous metal foil, has a size corresponding to the non-coated part of the first electrode 100, and has a tab protruding in the left side of the battery cell. The second electrode 400 has a structure which is laminated to correspond to the first electrode 100, and the main separator 200 is located between the first and second electrodes 100 and 400.

In the battery cell according to the present invention, an internal short circuit occurs when the first and second sub-separators 210 and 220 are moved in the right direction in a state that the first and second short circuit electrodes 310 and 320 are electrically connected to each other. As the first and second sub-separators 210 and 220 are moved in the right direction, the first electrode 100 and the first short circuit electrode 310 are grounded together, and at the same time, the second electrode 400 and the second short circuit electrode 320 are grounded together. Herein, since the first and second short circuit electrodes 310 and 320 are electrically connected to each other, an internal short circuit of the battery cell occurs between the first electrode 100 and the second electrode 400.

Second Embodiment

FIGS. 2 to 9 are diagrams illustrating assembling procedures of a battery cell for evaluating an internal short circuit according to one embodiment of the invention. Referring to FIG. 2, the first electrode 100 is formed of an aluminum foil and has a first electrode tab 120 protruding in the right upper direction, and the portion other than the first electrode tab 120 is the first electrode coated part 110 on which the electrode mixture layer is applied. The first electrode non-coated part, to which the electrode mixture layer has not been applied, is formed in the left center portion of the first electrode coated part 110. The area where the first electrode non-coated part 111 is formed corresponds to about 8% of the area of the first electrode coated part 110.

Referring to FIG. 3, the first sub-separator 210 is stacked on the first electrode 100 of FIG. 2. The first sub-separator 210 has a structure which covers the first electrode non-coated part 111 and is extended in the right direction of the battery cell. This is for easily taking out the first sub-separator 210 when evaluating the internal short circuit for the battery cell.

In FIG. 4, the first short circuit electrode 310 is located on the first sub-separator 210. The first short circuit electrode 310 is formed of a porous aluminum foil having a porosity ratio of about 60%. The first short circuit electrode 310 has a shape corresponding to that of the first electrode non-coated part 111 and has a structure in which a tab protruding in the left side of the battery cell is formed.

In FIG. 5, the main separator 200 is formed on the first short circuit electrode 310. The main separator 200 has, for example, a structure in which the inorganic particles of a nano size are dispersed on the surface of the fabric separator.

In FIG. 6, the second short circuit electrode 320 is formed on the main separator 200. The second short circuit electrode 320 is formed of a porous copper foil having a porosity ratio of about 60%. The second short circuit electrode 320 has a shape corresponding to that of a second electrode non-coated part to be described later and has a structure in which a tab protruding in the left side of the battery cell is formed. Respective protruding tabs of the first and second short circuit electrodes 310 and 320 are formed to be parallel to the left side of the battery cell.

Referring to FIG. 7, the second sub-separator 220 is laminated on the second short circuit electrode 320. The second sub-separator 210 has a structure which covers the second electrode non-coated part and is extended in the right direction of the battery cell. This is for easily taking out the second sub-separator 220 when evaluating the internal short circuit for the battery cell.

Referring to FIG. 8, the second electrode 400 is laminated on the second sub-separator 220. The second electrode 400 is formed of a copper foil and has a second electrode tab 420 protruding in the left upper direction, and the portion other than the second electrode tab 420 is the second electrode coated part on which the electrode mixture layer is applied. The second electrode 400 has a structure in which a non-coated part (not shown) is formed at a position corresponding to the first electrode non-coated part 111.

FIGS. 2 to 8 sequentially illustrate a process of forming a unit laminate for the inner short circuit of the battery cell. An electrode assembly for forming a battery cell according to the present invention may include a plurality of unit laminates, and in this case, a separate separator may be interposed between the unit laminates. Referring to FIG. 9, another main separator 201 is laminated on the second electrode 400. Another main separator 201 is for electrical insulation between other unit laminates.

In the above, the present invention has been described in more detail through the drawings. However, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

DESCRIPTION OF REFERENCE NUMERALS

100: first electrode
120: first electrode tab

110: first electrode coated part
111: first electrode non-coated part
200, 201: main separator
210: first sub-separator
220: second sub-separator
310: first short circuit electrode
320: second short circuit electrode
400: second electrode
420: second electrode tab

What is claimed is:

1. A battery cell for evaluating an internal short circuit, comprising:

a first electrode including a first metal current collector, a first electrode mixture layer disposed on one or both surfaces of the first metal current collector, and a first electrode tab;

a second electrode including a second metal current collector, a second electrode mixture layer disposed on one or both surfaces of the second metal current collector, and the second electrode tab;

a main separator between the first electrode and a second electrode;

a first sub-separator between the main separator and the first electrode; and a first short circuit electrode between the first sub-separator and the main separator, the first short circuit electrode partially protruding from between the first sub-separator and the main separator, wherein the first electrode includes a coated part region in which the first electrode mixture layer is disposed on the one or both surfaces of the first metal current collector, the first electrode tab protrudes in one direction from the coated part region, and the first electrode mixture layer is not disposed on the first electrode tab, wherein the second electrode includes a coated part region in which the second electrode mixture layer is disposed on the one or both surfaces of the second metal current collector, the second electrode tab protrudes in one direction from the coated part region, and the second electrode mixture layer is not disposed on the second electrode tab, and wherein the main separator covers the coated part region of the first electrode and the coated part region of the second electrode.

2. The battery cell of claim 1, wherein the first short circuit electrode is configured to contact the first electrode when the first sub-separator is removed.

3. The battery cell of claim 1, wherein the first short circuit electrode comprises a porous metal foil.

4. The battery cell of claim 3, wherein the porous metal foil has a porosity ration of 50% (v/v) or more.

5. The battery cell of claim 1, wherein the first electrode further comprises a non-coated part region, on which the first electrode mixture layer is not disposed.

6. The battery cell of claim 5, wherein the first short circuit electrode is disposed at a location corresponding to the non-coated part region of the first electrode.

7. The battery cell of claim 5, wherein the first sub-separator is configured to cover the non-coated part region of the first electrode and has an area greater than that of the non-coated part region of the first electrode.

8. The battery cell of claim 1, further comprising a second short circuit electrode between the second electrode and the main separator, the second short circuit electrode partially protruding from between the second electrode and the main separator.

9. The battery cell of claim 8, wherein the first electrode further comprises a non-coated part region, on which the first electrode mixture layer is not disposed, and the second short circuit electrode is disposed at a location corresponding to the non-coated part region of the first electrode.

10. The battery cell of claim 8, further comprising a second sub-separator between the second short circuit electrode and the second electrode.

11. The battery cell of claim 10, wherein the second electrode further comprises a non-coated part region, on which the second electrode mixture layer is not disposed.

12. The battery cell of claim 11, wherein the second sub-separator is configured to cover the non-coated part region of the second electrode and has an area greater than that of the non-coated part region of the second electrode.

13. The battery cell of claim 10, wherein the first and second sub-separators have a structure of a fabric separator which is formed of a porous fabric of a film material, and wherein the main separator has a structure of a safety-reinforced separator in which inorganic particles are dispersed on one or both surfaces of a fabric separator.

14. The battery cell of claim 1, wherein in the first and second electrodes, a ratio of an area, in which the non-coated part region is formed in the coated part region, is in a range of 5 to 15%.

15. The battery cell of claim 1, wherein the battery cell is a pouch-type lithium secondary battery.

16. The battery cell of claim 1, wherein the first sub-separator is removable by at least partially being taken out of the battery cell.

17. A battery cell for evaluating an internal short circuit, comprising:

a first electrode including a first metal current collector, a first electrode mixture layer disposed on one or both surfaces of the first metal current collector, and a first electrode tab;

a second electrode including a second metal current collector, a second electrode mixture layer disposed on one or both surfaces of the second metal current collector, and the second electrode tab;

a main separator between the first electrode and a second electrode;

a first sub-separator between the main separator and the first electrode;

a first short circuit electrode between the first sub-separator and the main separator, the first short circuit electrode partially protruding from between the first sub-separator and the main separator; and a second short circuit electrode between the second electrode and the main separator, the second short circuit electrode partially protruding from between the second electrode and the main separator.

18. The battery cell of claim 17, further comprising a second sub-separator between the second short circuit electrode and the second electrode.

19. The battery cell of claim 17, wherein the first electrode includes a coated part region in which the first electrode mixture layer is disposed on the one or both surfaces of the first metal current collector, the first electrode tab protrudes in one direction from the coated part region.

20. The battery cell of claim 19, wherein the first electrode further comprises a non-coated part region, on which the first electrode mixture layer is not disposed, and the first short circuit electrode is disposed at a location corresponding to the non-coated part region of the first electrode.

* * * * *